US012655273B2

(12) United States Patent
Zhao et al.

(10) Patent No.: US 12,655,273 B2
(45) Date of Patent: Jun. 16, 2026

(54) SILICATE-MODIFIED HIGH-TOUGHNESS AND LOW-HEAT POLYMER GROUTING MATERIAL FOR REINFORCEMENT

(71) Applicants: SAFEKEY Engineering Technology (Zhengzhou), Ltd., Zhengzhou (CN); Huizhou Mingsheng Chemical Materials Co., LTD.

(72) Inventors: Peng Zhao, Zhengzhou (CN); Hongyuan Fang, Zhengzhou (CN); Lei Wang, Huizhou (CN); Yanhui Pan, Zhengzhou (CN); Mingrui Du, Huizhou (CN); Chao Zhang, Huizhou (CN); Hui Liu, Zhengzhou (CN)

(73) Assignee: SAFEKEY Engineering Technology (Zhengzhou), Ltd., Zhengzhou (CN)

( * ) Notice: Subject to any disclaimer, the term of this patent is extended or adjusted under 35 U.S.C. 154(b) by 787 days.

(21) Appl. No.: 17/948,973

(22) Filed: Sep. 20, 2022

(65) Prior Publication Data

US 2023/0045296 A1 Feb. 9, 2023

(30) Foreign Application Priority Data

Jan. 28, 2022 (CN) ........................ 202210109279.1

(51) Int. Cl.

*C08K 9/08* (2006.01)
*C08G 18/20* (2006.01)
*C08G 18/77* (2006.01)
*C08K 3/34* (2006.01)

(52) U.S. Cl.

CPC ............ *C08K 9/08* (2013.01); *C08G 18/2027* (2013.01); *C08G 18/776* (2013.01); *C08K 3/34* (2013.01)

(58) Field of Classification Search

CPC ........ C08K 9/08; C08K 3/34; C08G 18/2027; C08G 18/776
USPC .......................................................... 523/207
See application file for complete search history.

(56) References Cited

FOREIGN PATENT DOCUMENTS

| | | | | | |
|---|---|---|---|---|---|
| CN | 103772681 A | * | 5/2014 | | |
| CN | 113817152 A | * | 12/2021 | ............... | D01F 6/92 |
| JP | 2000345427 A | * | 12/2000 | | |
| KR | 100906715 B1 | * | 7/2009 | ............. | C09K 21/12 |

OTHER PUBLICATIONS

CN103772681A translation; Cheng et al., Copolyester, and preparation method and use thereof (Year: 2012).*

CN113817152A translation; Wang et al., Flame-retardant anti-dripping copolyester based on high-temperature self-crosslinking as well as preparation method and application of flame-retardant anti-dripping copolyester (Year: 2020).*

JP2000345427A translation; Aranaga et al., Flame retardant anti-bacterial fiber (Year: 1999).*

KR100906715B1 translation; Park et al., Flame retarding oligomer containing phosphate and method of preparing the same (Year: 2009).*

* cited by examiner

*Primary Examiner* — Arrie L Reuther
*Assistant Examiner* — Doris Ling

(57) ABSTRACT

The present invention relates to a silicate-modified high-toughness and low-heat polymer grouting material for reinforcement, which belongs to the technical field of materials. About 60% by weight of the raw materials of the silicate modified grouting material of the present invention is the silicate modified aqueous solution, and about 40% is the structural flame retardant isocyanate, and main components of the polymer grouting material are classified into inorganic components according to the main total proportion. The silicate-modified high-toughness and low-heat polymer grouting material for reinforcement of the present invention has excellent flame retardancy and compressive performance, wherein a compressive strength is ≥60 MPa, an oxygen index is ≥30%, and a maximum reaction temperature is ≤100° C., an odor grade (80° C.) is ≤3.5, a fog test is ≤5 mg (no physical additive flame retardant diffuses to the environment), bonding is ≥3 MPa, a shear strength is ≥20 MPa, and a tensile strength is ≥20 MPa.

1 Claim, No Drawings

SILICATE-MODIFIED HIGH-TOUGHNESS AND LOW-HEAT POLYMER GROUTING MATERIAL FOR REINFORCEMENT

CROSS REFERENCE OF RELATED APPLICATION

The present application claims priority under 35 U.S.C. 119 (a-d) to CN 202210109279.1, filed Jan. 28, 2022.

BACKGROUND OF THE PRESENT INVENTION

Field of Invention

The present invention relates to a silicate-modified high-toughness and low-heat polymer grouting material for reinforcement, which belongs to the technical field of materials.

Description of Related Arts

During the excavation process of coal mine tunnels and tunnels, broken or loose coal and rock mass often lead to accidents such as roof fall, gangway, rib spalling, etc., which not only seriously endanger the life safety of workers, but also seriously affect the production efficiency of enterprises. On the other hand, at present, highways and other infrastructures have shifted from large-scale construction to a period of large-scale maintenance, and the problems of water stabilization layer fracture, fragmentation and water damage have become increasingly serious. Due to the particularity of highway maintenance, large-scale excavation is no longer realistic. Thus, whether it is in the process of excavation of coal mine tunnels or road maintenance, it is generally necessary to perform grouting reinforcement on the broken coal rock mass or the broken water stable layer. There are various types of grouting materials, generally classified into inorganic grouting materials and organic grouting materials. The inorganic materials are widely used in two-liquid grouting of water glass and cement. The advantages of the inorganic materials are that the cost is low, the reaction is basically not exothermic, but the curing speed is slow, the compressive strength and bonding strength are low, and the permeability and toughness are low. The organic grouting materials include acrylamide chemical grouting materials, epoxy resin chemical grouting materials, methyl methacrylate chemical grouting materials, urea-formaldehyde resin chemical grouting materials and polyurethane chemical grouting materials; wherein due to its moderate viscosity, adjustable setting time, fast reaction speed, good mechanical properties, convenient construction method and many other advantages, the polyurethane grouting materials become the optimal choice for engineering water blocking reinforcement and loose cementation and are widely used in underground engineering such as coal mine and road engineering The polyurethane and other polymer materials themselves are not flame retardant, wherein the oxygen index is about 17% under a condition without adding flame retardants, which cannot meet the flame retardant requirements of coal mines. The flame retardant properties of polymer materials can be improved by adding physical flame retardants such as tris (chloroethyl) phosphate (TCEP), tris (1-chloro-2-propyl) phosphate (TCPP), and this manner is convenient and low cost, but there are the four problems as follows.

1. Most of the additive physical flame retardants contain halogen elements such as chlorine and bromine, but halogen flame retardants may contaminate coal, produce acid gas when burning and cause air pollution, or poison heavy metal catalysts when used as chemical coal, seriously affecting industrial production.

2. The molecular weight of the added physical flame retardant used in rigid polyurethane foam is small, and it will migrate to the surface of the polymer material over time, reducing the flame retardancy of the polymer material and affecting the soil and groundwater sources.

3. The additive physical flame retardant does not participate in the structure of the polymer material, which will adversely affect the physical properties such as the strength of the polymer material.

4. The price of halogen-containing flame retardants is low, and the price of replacing halogen-containing flame retardants is high, especially for chlorine-containing flame retardants because the chlorine gas raw material required for its synthesis is a chemical by-product and the price is low; alternatives of flame retardant simply containing Phosphorus or Nitrogen are expensive.

The silicate-modified high-toughness and low-heat polymer grouting material for reinforcement combines the advantages of inorganic grouting materials and polymer grouting materials and has characteristics of good flame retardancy, fast curing speed, high strength, low cost and small heat release. The disadvantage is that the physical properties such as strength, toughness and cohesion are far inferior to those of polyurethane grouting materials, especially when the exotherm is ≤100° C., the shortcomings of physical properties such as strength, toughness and cohesion are more prominent.

SUMMARY OF THE PRESENT INVENTION

The silicate-modified high-toughness and low-heat polymer grouting material for reinforcement of the present invention has excellent flame retardancy and compressive performance, wherein a compressive strength is ≥60 MPa, an oxygen index is ≥30%, and a maximum reaction temperature is ≤100° C., an odor grade (80° C.) is ≤3.5, a fog test is ≤5 mg (no physical additive flame retardant diffuses to the environment), bonding is ≥3 MPa, a shear strength is ≥20 MPa, and a tensile strength is ≥20 MPa. In particular, the structural flame retardant of isocyanate endows itself with good flame retardant ability and toughness, eliminating the need for the prepolymerization step of polymerizing MDI. The silicate-modified high-toughness and low-heat polymer grouting material of the present invention does not contain halogen flame retardants, emits less smoke, does not emit corrosive or irritating hydrogen halide gas with a smoke toxicity index of ≤5.

A first object of the present invention is to provide a silicate-modified high-toughness and low-heat polymer grouting material for reinforcement, comprising: a modified isocyanate and a silicate-modified aqueous solution; wherein a weight ratio of the modified isocyanate and the silicate-modified aqueous solution is at a range of 1:(1.25-1.3); a content of P in the modified isocyanate is 4.4%, a content of N in the modified isocyanate is 7.9%, and a content of NCO % in the modified isocyanate is 11.9%; and a structural formula of the modified isocyanate is as follows:

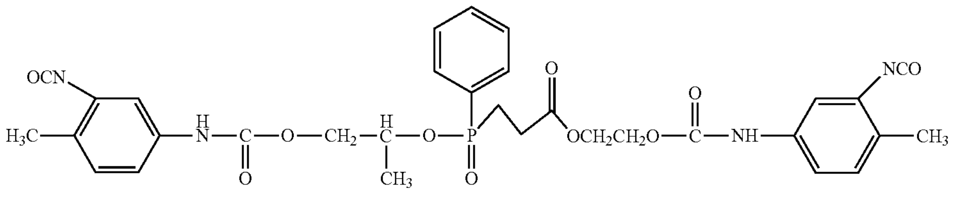

wherein components of the silicate-modified aqueous solution comprises: liquid sodium silicate, water, and a catalyst; wherein the liquid sodium silicate accounts for 90-95% by weight of the silicate-modified aqueous solution; the water accounts for 5-8% by weight of the silicate-modified aqueous solution; and the catalyst accounts for 0.5-1.5% by weight of the silicate-modified aqueous solution.

Preferably, the liquid sodium silicate is an aqueous solution of sodium silicate, and a Baume degree thereof is 40.

Preferably, the liquid sodium silicate is 2451 by Qingdao Haiwan Chemical.

Preferably, the catalyst is a diethylene glycol solution of triethylenediamine with a concentration of 33%.

Preferably, the catalyst is 33lv from Evonik Specialty Chemicals (Shanghai) Co., Ltd.

A second object of the present invention is to provide a method for synthezing the silicate-modified high-toughness and low-heat polymer grouting material for reinforcement, which is characterized in that the silicate-modified high-toughness and low-heat polymer grouting material for reinforcement is obtained by reacting the modified isocyanate and the silicate modified aqueous solution, and synthetic steps of the modified isocyanate comprises:

(1) generating 2-carboxyethyl phenyl hypophosphite ethylene glycol ester by reacting 2-carboxyethyl phenyl hypophosphorous acid and ethylene glycol according to a mole ratio of 1:1, and a reaction equation is as follows:

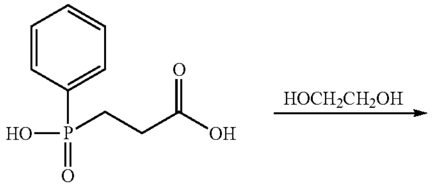

-continued

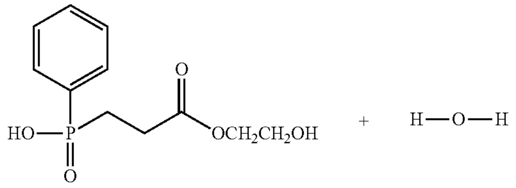

(2) generating a phosphorus-containing dihydric alcohol intermediate by processing an addition reaction between the 2-carboxyethylphenyl ethylene glycol hypophosphite and propylene oxide; and a reaction equation is as follows:

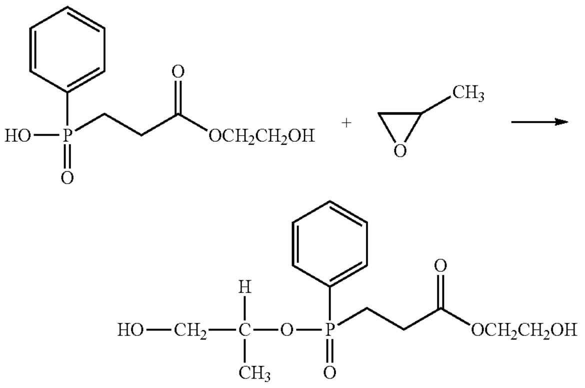

(3) polymerizing the phosphorus-containing dihydric alcohol intermediate and TDI are to obtain a difunctional modified flame retardant isocyanate compound, and a synthesis reaction equation is as follows:

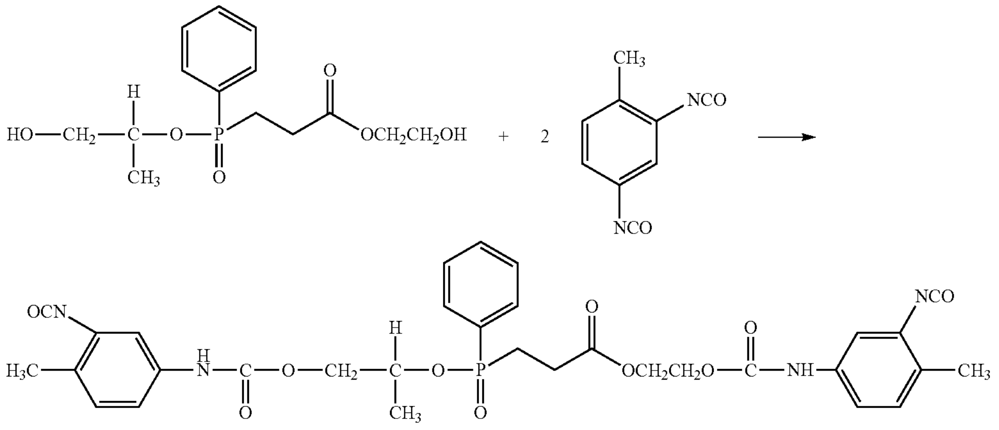

Preferably, a specific synthesizing process of the silicate-modified high-toughness and low-heat polymer grouting material for reinforcement comprising steps of:

(1) sending the 2-carboxyethylphenyl hypophosphorous acid by Wuhan Hezhong Biochemical Manufacturing Co., Ltd. and the ethylene glycol into a reaction kettle according to a molar ratio of 1:1, performing esterification under catalysis of sulfuric acid or organotin at a temperature in a range of 105-110° C., distilling off water generated from a column overhead, and obtaining 2-carboxyethylphenyl ethylene glycol hypophosphite;

(2) heating the 2-carboxyethylphenyl ethylene glycol hypophosphite to a temperature in a range between 100 and 110° C. in the reactor, adopting potassium hydroxide as a catalyst, slowly adding propylene oxide in a molar ratio of 1:1; wherein reaction pressure gradually rises in the reactor, but a maximum pressure is kept below a pressure of 2.5 kg, keeping a temperature in the kettle between a range of 100-115° C., is maintaining the pressure for 4 hours after the feeding is completed, keeping the temperature in the reactor at about 100° C., processing vacuum pumping to remove un-reacted small molecules, and obtaining the phosphorus-containing dihydric alcohol intermediate;

(3) heating the reactor to 48° C.-52° C., firstly adding all of the TDI according to a molar ratio of phosphorus-containing dihydric alcohol intermediate: TDI=1:(3-4), and then adding all of the phosphorus-containing dihydric alcohol intermediate at a uniform speed;

(4) heating the reactor to a temperature in a range of 78° C.-82° C., and then reacting for 1.9 h-2.2 h;

(5) removing TDI which is excessive and not reacted by a thin film evaporator;

(6) cooling the reactor to a temperature in a range of 48° C.-52° C., taking out from the reactor and obtaining the modified isocyanate containing 4.4% of P; 7.9% of N and 11.9% of NCO % after packaging;

(7) mixing the modified isocyanate and the silicate-modified aqueous solution according to a mass ratio in a range of 1:(1.25-1.3) to obtain the silicate modified high-toughness and low-heat polymer grouting material for reinforcement.

Beneficial effects of the present invention are as follows.

1. Compared with the conventionally used polymeric MDI or modified polymeric MDI, the -NCO group of TDI is less active due to steric hindrance. Both ends of the modified isocyanate of the present invention are capped with TDI, the molecular weight is high, reactivity is relatively moderate, which avoids the problem of rapid rise in system temperature caused by severe exotherm, keeps the system temperature to be ≤100° C., and meanwhile, the appropriate reactivity improves the adhesion.

2. The present invention branches long chain segments in the modified isocyanate, which greatly increases the toughness of the material; avoids the addition of halogen and non-halogen plasticizers and flame retardants such as chlorinated paraffin, and on the one hand improves the resistance compressive, shear and tensile strength of the material, while on the other hand, avoiding the increased odor and fog test value caused by adding halogen and non-halogen plasticizers and flame retardants to the system (the lower the fog test result, the more physically added flame retardants have less diffusion to the environment). Especially, the material of the present invention does not contain halogen plasticizers, the combustion smoke is small, and corrosive or irritating hydrogen halide gas will not be released; toxic carcinogens polybrominated benzoxins and polybrominated dibenzofurans will not be produced, avoiding the long-term impact of the material on the environment.

3. In the present invention, the branched long chain segment in the modified isocyanate contains phosphorus flame retardant element, and the inorganic component of silicate can obtain a high oxygen index even without adding a flame retardant.

The present invention overcomes the problems that the strength, toughness, cohesion and other physical properties of the silicate-modified polymer material are far inferior to those of the polyurethane grouting material. The grouting material of the present invention has the characteristics of: an oxygen index ≥30%, a maximum reaction temperature ≤100° C., an odor level (80° C.) ≤3.5, a fog test ≤5 mg (no physical additive flame retardants diffuse to the environment), a bonding ≥3 MPa, a shear strength ≥20 MPa, and a tensile strength ≥20 MPa.

DETAILED DESCRIPTION OF THE PREFERRED EMBODIMENT

The technical solutions in the embodiments of the present invention will be described clearly and completely below. Obviously, the described embodiments are only a part of the embodiments of the present invention, rather than all the embodiments. Based on the embodiments of the present invention, all other embodiments obtained by those of ordinary skill in the art without creative efforts shall fall within the protection scope of the present invention.

Example 1

According to a preferred embodiment of the present invention, a silicate-modified high-toughness and low-heat polymer grouting material for reinforcement, comprises: a modified isocyanate and a silicate-modified aqueous solution; wherein a weight ratio of the modified isocyanate and the silicate-modified aqueous solution is at a range of 1:(1.25-1.3); a content of P in the modified isocyanate is 4.4%, a content of N in the modified isocyanate is 7.9%, and a content of NCO % in the modified isocyanate is 11.9%; and a structural formula of the modified isocyanate is as follows:

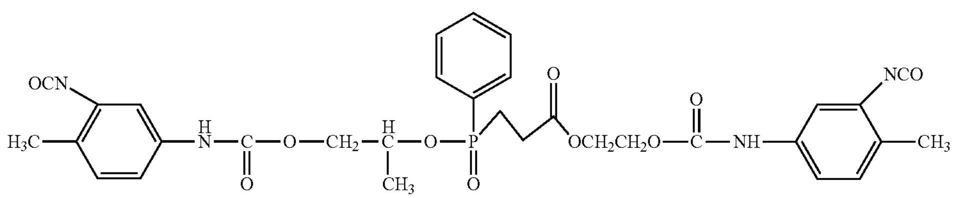

Components of the silicate-modified aqueous solution comprises: liquid sodium silicate, water, and a catalyst; wherein the liquid sodium silicate accounts for 90-95% by weight of the silicate-modified aqueous solution; the water accounts for 5-8% by weight of the silicate-modified aqueous solution; and the catalyst accounts for 0.5-1.5% by weight of the silicate-modified aqueous solution. The liquid sodium silicate is an aqueous solution of sodium silicate, and a Baume degree thereof is 40. The liquid sodium silicate is 2451 by Qingdao Haiwan Chemical. The catalyst is a diethylene glycol solution of triethylenediamine with a concentration of 33%. The catalyst is 33lv from Evonik Specialty Chemicals (Shanghai) Co., Ltd.

According to the preferred embodiment of the present invention, a method for synthezing the silicate-modified high-toughness and low-heat polymer grouting material for reinforcement, which is characterized in that the silicate-modified high-toughness and low-heat polymer grouting material for reinforcement is obtained by reacting the modified isocyanate and the silicate modified aqueous solution, and synthetic steps of the modified isocyanate comprises:

(1) generating 2-carboxyethyl phenyl hypophosphite ethylene glycol ester by reacting 2-carboxyethyl phenyl hypophosphorous acid and ethylene glycol according to a mole ratio of 1:1, and a reaction equation is as follows:

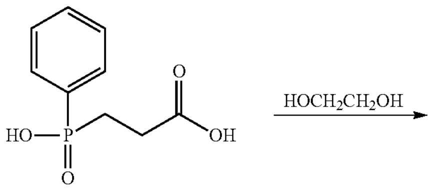

-continued

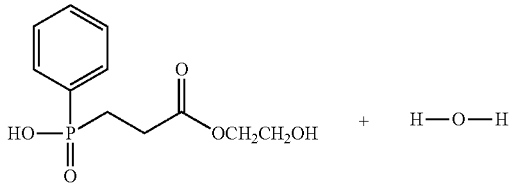

(2) generating a phosphorus-containing dihydric alcohol intermediate by processing an addition reaction between the 2-carboxyethylphenyl ethylene glycol hypophosphite and propylene oxide; and a reaction equation is as follows:

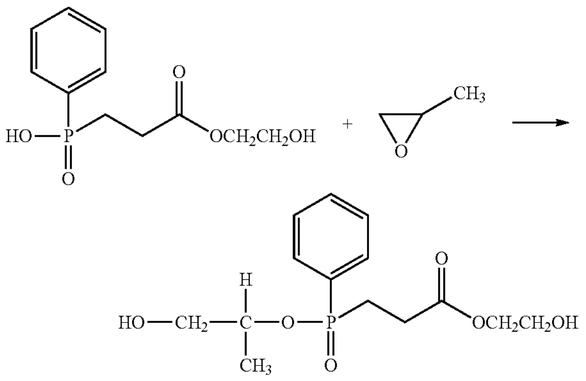

(3) polymerizing the phosphorus-containing dihydric alcohol intermediate and TDI are to obtain a difunctional modified flame retardant isocyanate compound, and a synthesis reaction equation is as follows:

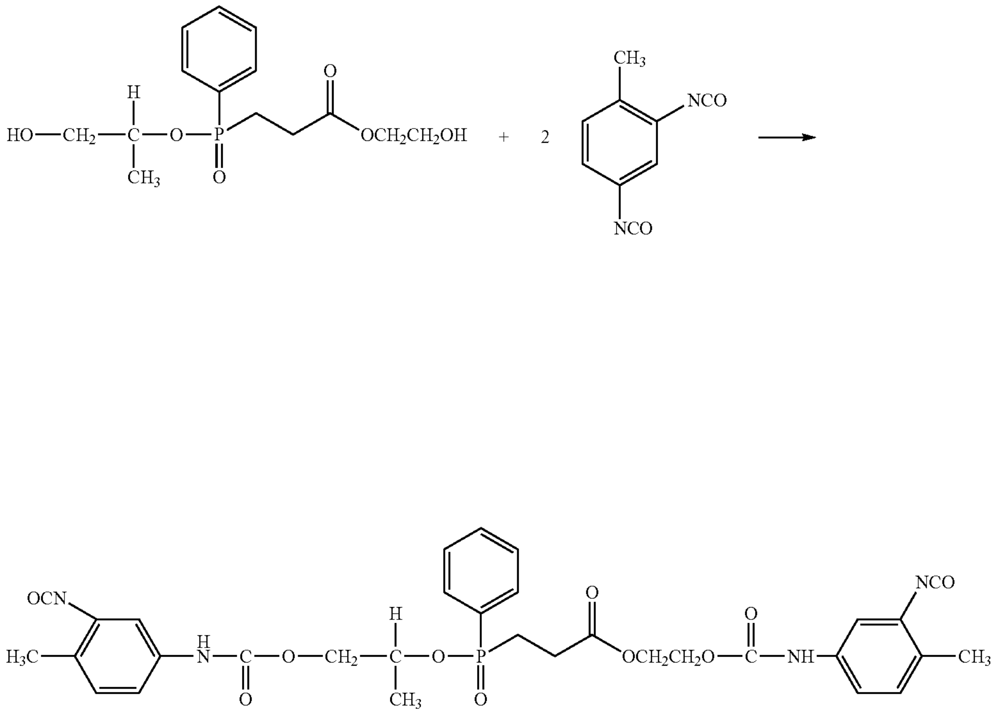

A specific synthesizing process of the silicate-modified high-toughness and low-heat polymer grouting material for reinforcement comprising steps of:

(1) sending the 2-carboxyethylphenyl hypophosphorous acid by Wuhan Hezhong Biochemical Manufacturing Co., Ltd. and the ethylene glycol into a reaction kettle according to a molar ratio of 1:1, performing esterification under catalysis of sulfuric acid or organotin at a temperature in a range of 105-110° C., distilling off water generated from a column overhead, and obtaining 2-carboxyethylphenyl ethylene glycol hypophosphite;

(2) heating the 2-carboxyethylphenyl ethylene glycol hypophosphite to a temperature in a range between 100 and 110° C. in the reactor, adopting potassium hydroxide as a catalyst, slowly adding propylene oxide in a molar ratio of 1:1; wherein reaction pressure gradually rises in the reactor, but a maximum pressure is kept below a pressure of 2.5 kg, keeping a temperature in the kettle between a range of 100-115° C., is maintaining the pressure for 4 hours after the feeding is completed, keeping the temperature in the reactor at about 100° C., processing vacuum pumping to remove un-reacted small molecules, and obtaining the phosphorus-containing dihydric alcohol intermediate;

(3) heating the reactor to 48° C.-52° C., firstly adding all of the TDI according to a molar ratio of phosphorus-containing dihydric alcohol intermediate: TDI=1:(3-4), and then adding all of the phosphorus-containing dihydric alcohol intermediate at a uniform speed;

(4) heating the reactor to a temperature in a range of 78° C.-82° C., and then reacting for 1.9 h-2.2 h;

(5) removing TDI which is excessive and not reacted by a thin film evaporator;

(6) cooling the reactor to a temperature in a range of 48° C.-52° C., taking out from the reactor and obtaining the modified isocyanate containing 4.4% of P; 7.9% of N and 11.9% of NCO % after packaging;

(7) mixing the modified isocyanate and the silicate-modified aqueous solution according to a mass ratio in a range of 1:(1.25-1.3) to obtain the silicate modified high-toughness and low-heat polymer grouting material for reinforcement.

Test Examples

A specific example of a modified isocyanate compound of the present invention in this test example to the grouting material is as follows.

A formulation of aqueous silicate is as follows:

| | |
|---|---|
| 2451 (Silicate Aqueous Solution, by Qingdao Haiwan) | 92 |
| Water | 7.5 |
| A33 (Catalyst, Evonik Specialty Chemicals (Shanghai) Co., Ltd.) | 0.5 |
| Total | 100 |

Mix and stir 130 parts of the silicate aqueous solution mentioned above and 100 parts of the isocyanate component of each example in the following table to prepare a grouting material.

Isocyanate components in each test example:

| | Name | Text example 1 | Text example 2 | Text example 3 | Text example 4 |
|---|---|---|---|---|---|
| Isocyanate component | PM200 (Wanhua Chemical Group Co., Ltd.) | 100 | 0 | 0 | 74 |
| | 100LL (Wanhua Chemical Group Co., Ltd.) | 0 | 100 | 0 | 0 |
| | Difunctional Modified Flame Retardant Isocyanate Compounds | 0 | 0 | 100 | 0 |
| | Tep | 0 | 0 | 0 | 26 |

The isocyanates corresponding to the above Test examples 1, 2, 3, and 4 according to the formula fractions in the above table are equal in weight, and fully react with the silicate aqueous solution in a weight ratio of 100:130.

The flame retardant and physical properties of each Test example are as follows:

| | Name | Text example 1 | Text example 2 | Text example 3 | Text example 4 |
|---|---|---|---|---|---|
| Flame retardant properties | Oxygen Index (%) | 28.1 | 28.0 | 29.2 | 28.9 |
| Physical properties | Maximum reaction temperature (° C.) | 113 | 112 | 89 | 96 |
| | Compressive strength (MPa) | 46 | 41 | 45 | 33 |
| | Maximum compression set (%) | 31 | 33 | 48 | 41 |
| | Bond strength, MPa | 3.3 | 3.1 | 4.2 | 2.6 |
| Environmental performance | Odor level (80° C.) | 4 | 4 | 4 | 5 |
| | Fog test (/ mg) | 5.64 | 5.89 | 5.56 | 68 |

Flame Retardant Properties and Physical Properties Test Standard: AQ1089-2020.

Odor level test standard: VDA270:1992;

Fog test standard: Q/ZK JS 364-201903.

In Test Example 3, identical quality of modified isocyanate is used instead of Pm200 on the basis of Test Example 1. Everything else remains unchanged. The OI is increased from 28.1 to 29.2, wherein 1.1 is increased. The reaction temperature decreased from 113° C. to 89° C. The compressive strength is 46 MPa and 45 MPa respectively, with little change. The compression set increased from 31% to 48%, indicating that the toughness of the material has improved significantly, and the bond strength is also increased from 3.3 MPa to 4.2 MPa. The odor level is 4, with o change. Fog test is from 5.64 mg to 5.56 mg, there is little change, indicating that the modified isocyanate has apparent advantages in flame retardancy, maximum reaction temperature, toughness and bond strength.

In Test Example 3, identical quality of modified isocyanate is used instead of 100 LL on the basis of Test Example 2. Everything else remains unchanged. The OI is increased from 28.0 to 29.2, wherein 1.2 is increased. The reaction temperature decreased from 112° C. to 89° C. The compressive strength is raised from 41 MPa and 45 MPa. The compression set increased from 33% to 48%, indicating that the toughness of the material has improved significantly, and the bond strength is also increased from 3.1 MPa to 4.2 MPa. The odor level is 4, with o change. Fog test is dropped from 5.89 mg to 5.56 mg, there is small change, indicating that comparing with the 100 LL, the modified isocyanate has apparent advantages in flame retardancy, maximum reaction temperature, toughness and bond strength.

In Test Example 4, 26 parts of a flame retardant of tep is used to replace PM200 of an identical quality on the basis of Test Example 1. Everything else remains unchanged. OI is increased from 28.1 to 28.9, a maximum reaction temperature is decreased from 113° C. to 96° C., with a decrease of 17° C. Compressive strength is decreased from 46 MPa to 33 Mpa. A maximum compressive deformation is increased from 31% to 41%, a bond strength decreased from 3.3 Mpa to 2.6 MPa, an odor level increased from 4 to 5, and a fog test value is increased from 6.34 mg to 68 mg, with an increase of 10 times, indicating that adding a flame retardant to improve the flame retardant performance will reduce the reaction temperature, compressive strength, and bonding strength, improve the flame retardant performance and toughness, and reduce the environmental protection performance of the material.

In Test example 4, Pm200 is used as isocyanate on the basis of Test Example 3, and flame retardant of tep is add at the same time, in such a manner that phosphorus content of the system is consistent. A maximum reaction temperature is increased from 89° C. to 96° C., and a compressive strength is reduced from 45 Mpa to 33 Mpa. A maximum deformation is reduced from 48% to 41%. Bond strength is reduced from 4.2 Mpa to 2.6 Mpa, an odor level is increased from 4 to 5. A fog test value is increased from 5.56 to 68, with an increase of 13 times, indicating that use of modified isocyanate improves the flame retardant properties have great advantages in controlling reaction temperature, improving material compressive strength, bonding strength, material toughness and improving environmental performance.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for synthesizing a silicate-modified polymer grouting material for reinforcement, comprising steps of:

(1) sending 2-carboxyethylphenyl hypophosphorous acid and ethylene glycol into a reaction kettle according to a molar ratio of 1:1, performing esterification under catalysis of sulfuric acid or organotin at a temperature in a range of 105-110° C., distilling off water generated from a column overhead, and obtaining 2-carboxyethylphenyl ethylene glycol hypophosphite; wherein a reaction equation is as follows:

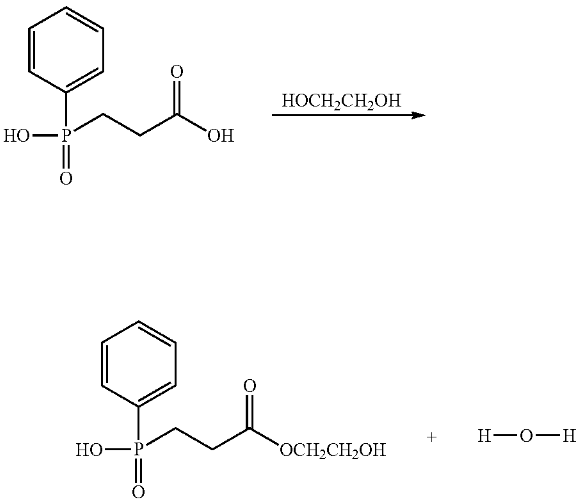

(2) heating the 2-carboxyethylphenyl ethylene glycol hypophosphite to a temperature in a range between 10° and 110° C. in a reactor, adopting potassium hydroxide as a catalyst, adding propylene oxide in a molar ratio of 1:1; wherein reaction pressure gradually rises in the reactor, but a maximum pressure is kept below a pressure of 2.5 kg, keeping a temperature in the kettle between a range of 100-115° C., is maintaining the pressure for 4 hours after feeding is completed, keeping the temperature in the reactor at about 100° C., processing vacuum pumping to remove un-reacted molecules, and obtaining a phosphorus-containing dihydric alcohol intermediate; wherein a reaction equation is as follows:

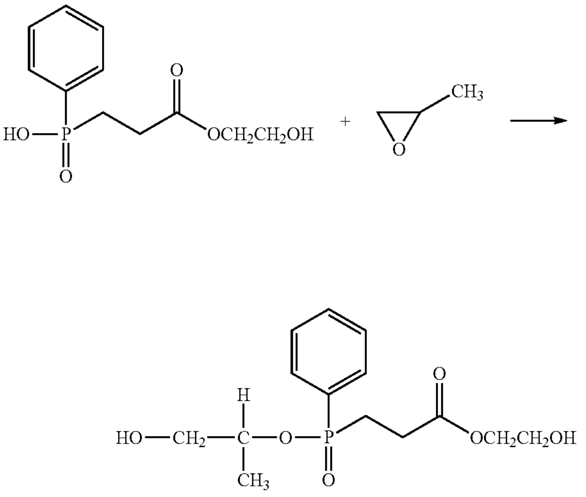

(3) heating the reactor to 48° C.-52° C., firstly adding all of TDI (toluene diisocyanate) according to a molar ratio of phosphorus-containing dihydric alcohol intermediate: TDI=1:(3-4), and then adding all of the phosphorus-containing dihydric alcohol intermediate at a uniform speed;

(4) heating the reactor to a temperature in a range of 78° C.-82° C., and then reacting for 1.9 h-2.2 h; wherein a reaction equation is as follows:

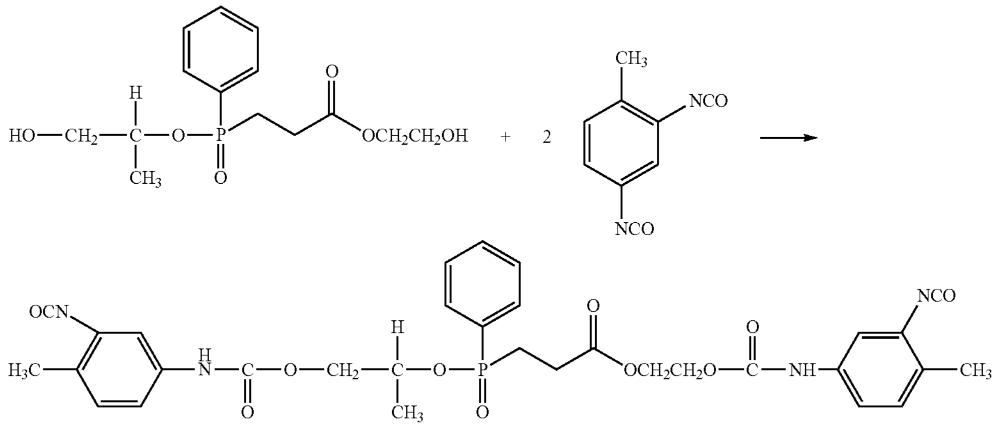

(5) removing TDI which is not reacted by a thin film evaporator;

(6) cooling the reactor to a temperature in a range of 48° C.-52° C., taking out from the reactor and obtaining modified isocyanate containing 4.4 wt. % of P (phosphorus); 7.9 wt. % of N (nitrogen and 11.9 wt. % of NCO % (isocyanate) after packaging; wherein a structural formula of the modified isocyanate is as follows:

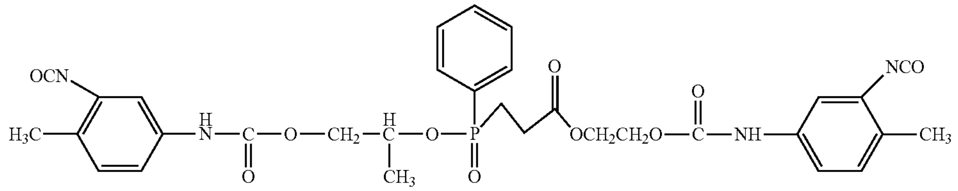

(7) mixing the modified isocyanate and a silicate-modified aqueous solution according to a mass ratio in a range of 1:(1.25-1.3) to obtain the silicate modified high-toughness and low-heat polymer grouting material for reinforcement; wherein components of the silicate-modified aqueous solution comprises: liquid sodium silicate, water, and a catalyst; wherein the liquid sodium silicate accounts for 90-95% by weight of the silicate-modified aqueous solution; the water accounts for 5-8% by weight of the silicate-modified aqueous solution; and the catalyst accounts for 0.5-1.5% by weight of the silicate-modified aqueous solution.

* * * * *